United States Patent
Yang et al.

(10) Patent No.: US 9,913,186 B2
(45) Date of Patent: Mar. 6, 2018

(54) SNR-BASED BLIND FAST RETURN TO LTE AFTER A CSFB OR SRVCC CALL

(71) Applicant: QUALCOMM Incorporated, San Diego, CA (US)

(72) Inventors: Ming Yang, San Diego, CA (US); Hui Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 14/811,792

(22) Filed: Jul. 28, 2015

(65) Prior Publication Data
US 2017/0034753 A1 Feb. 2, 2017

(51) Int. Cl.
| | |
|---|---|
| *H04W 36/14* | (2009.01) |
| *H04W 36/00* | (2009.01) |
| *H04W 36/28* | (2009.01) |
| *H04W 36/30* | (2009.01) |
| *H04W 36/36* | (2009.01) |
| *H04W 88/06* | (2009.01) |

(52) U.S. Cl.
CPC ....... *H04W 36/14* (2013.01); *H04W 36/0022* (2013.01); *H04W 36/0088* (2013.01); *H04W 36/28* (2013.01); *H04W 36/30* (2013.01); *H04W 36/36* (2013.01); *H04W 36/0083* (2013.01); *H04W 88/06* (2013.01)

(58) Field of Classification Search
CPC ........ H04W 76/02; H04W 8/26; H04W 36/14
See application file for complete search history.

(56) References Cited

U.S. PATENT DOCUMENTS

| | | | |
|---|---|---|---|
| 8,830,858 B2 | 9/2014 | Macias et al. | |
| 8,942,720 B2* | 1/2015 | Siomina | H04W 64/00 455/456.1 |
| 9,615,377 B2* | 4/2017 | Balakrishnan | H04W 48/14 |
| 2010/0279691 A1 | 11/2010 | Dwyer et al. | |
| 2010/0317347 A1 | 12/2010 | Burbidge et al. | |
| 2013/0070728 A1 | 3/2013 | Umatt et al. | |
| 2013/0260765 A1 | 10/2013 | Aoyagi et al. | |
| 2014/0112119 A1 | 4/2014 | Chen et al. | |
| 2014/0113636 A1 | 4/2014 | Lee et al. | |

FOREIGN PATENT DOCUMENTS

WO     2014101349 A1     7/2014

OTHER PUBLICATIONS

International Search Report and Written Opinion—PCT/US2016/043872—ISA/EPO—dated Sep. 12, 2016.

\* cited by examiner

*Primary Examiner* — Chandrahas B Patel
(74) *Attorney, Agent, or Firm* — Arent Fox, LLP

(57) ABSTRACT

A method, a computer-readable medium, and an apparatus for switching between a first radio access network (RAN) using the first radio access technology (RAT) and the second RAN using a different, second RAT are provided. The method includes switching a wireless device operating at a first signal frequency in the first RAN to a second RAN and switching from the second RAN back to the first RAN. In an aspect, the wireless device is switched to one of the cells operating at the first signal frequency in the first RAN if each signal parameter from the one of the cells satisfies a criterion. The wireless device is otherwise switched to another one of the cells operating at a second signal frequency in the first RAN based on parameters from the another one of the cells. The first signal frequency is different from the second signal frequency.

26 Claims, 11 Drawing Sheets

SNR-BASED BLIND FAST RETURN TO LTE AFTER A CSFB OR SRVCC CALL

BACKGROUND

Field

The present disclosure relates generally to communication systems, and more particularly, to a system that enables use of multiple radio access technologies.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Circuit-switched fallback (CSFB) is a feature of LTE wireless networks that enables user equipment (UE) to connect to other networks that use circuit-switching technologies. For example, a UE may use CSFB to use CS-based voice services while otherwise being connected to an LTE network. In another example, a Voice-over-LTE (VOLTE) supported UE may leave an LTE coverage area; in such instances, the VOLTE-supported call may be subject to handover to a 2G/3G network (e.g., a Single Radio Voice Call Continuity (SRVCC) procedure). As both CS-based and packet-switched (PS) based networks like LTE coexist, there is a need to enable the networks to co-exist and for devices to effectively use both networks based on the service desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for switching between the first radio access network (RAN) using a first radio access technology (RAT) and a second RAN using a second RAT different from the first RAT are provided. For instance, the method includes switching a wireless device operating at a first signal frequency in the first RAN to the second RAN. Also, the method includes switching the wireless device from the second RAN back to the first RAN. In an aspect, the wireless device is switched to one of the cells operating at the first signal frequency in the first RAN if each of one or more signal parameters from the one of the cells satisfies a criterion. In an aspect, the wireless device is otherwise switched to the another one of the cells operating at a second signal frequency in the first RAN based on one or more parameters from another one of the cells, wherein the first signal frequency is different from the second signal frequency. In an aspect, the method can optionally include measuring a receive strength signal indicator (RSSI) for a plurality of channel frequencies. Also, the method can also optionally include generating a list of candidate cells in the first RAN that have a measured RSSI above the power threshold. Finally, the method can also optionally include switching to a cell on the candidate cell list if its SNR is above the quality threshold.

In another aspect, an apparatus for switching between a first radio access network (RAN) using a first radio access technology (RAT) and a second RAN using a second RAT different from the first RAT is provided. For instance, the apparatus includes means for switching a wireless device operating at a first signal frequency in the first RAN to the second RAN. Also, the apparatus includes means for switching the wireless device from the second RAN back to the first RAN that is configured to switch the wireless device to one of the cells operating at the first signal frequency in the first RAN if each of one or more signal parameters from the one of the cells satisfies a criterion and otherwise switch the wireless device to another one of the cells operating at a second signal frequency in the first RAN based on one or more parameters from the another one of the cells, wherein the first signal frequency is different from the second signal frequency.

In another aspect, an apparatus for switching between a first radio access network (RAN) using a first radio access technology (RAT) and a second RAN using a second RAT different from the first RAT is provided. For instance, the apparatus includes a memory and at least one processor coupled to the memory. In an aspect, for example, the processor is configured to switch a wireless device operating at a first signal frequency in the first RAN to the second RAN. Also, the processor is configured to switch the wireless device from the second RAN back to the first RAN. In an aspect, the wireless device is switched to one of the cells operating at the first signal frequency in the first RAN if each of one or more signal parameters from the one of the cells satisfies a criterion. In an aspect, the wireless device is otherwise switched to another one of the cells operating at a second signal frequency in the first RAN based on one or more parameters from the another one of the cells, wherein the first signal frequency is different from the second signal frequency.

In another aspect, a computer-readable medium storing computer-executable code for switching between a first radio access network (RAN) using a first radio access technology (RAT) and a second RAN using a second RAT different from the first RAT is provided. For instance, the computer-readable medium includes code for switching a wireless device operating at a first signal frequency in the first RAN to the second RAN. Also, the computer-readable medium includes code for switching the wireless device from the second RAN back to the first RAN. In an aspect, the wireless device is switched to one of the cells operating at the first signal frequency in the first RAN if each of one or more signal parameters from the one of the cells satisfies a criterion. In an aspect, the wireless device is otherwise switched to another one of the cells operating at a second signal frequency in the first RAN based on one or more parameters from the another one of the cells, wherein the first signal frequency is different from the second signal frequency.

DETAILED DESCRIPTION

Figure 1:
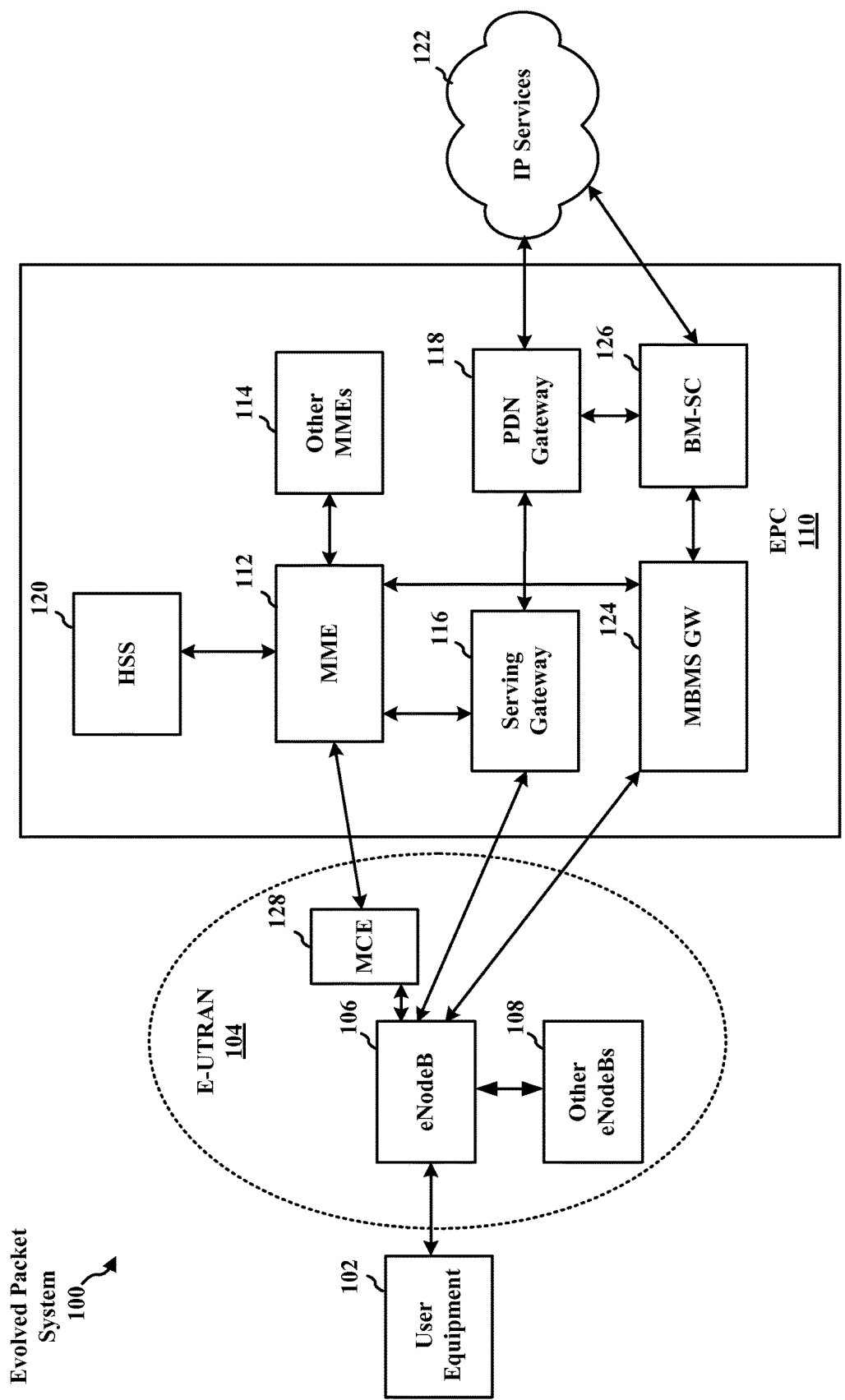
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

The present disclosure provides for an optimized blind fast-return method for a mobile device returning to a packet-switched (PS) network from a connection on circuit-switched (CS) network that was made via a circuit-switched fallback (CSFB) procedure. In particular, the present disclosure relates to using preferred frequencies and/or cells in the target PS network during the blind fast return procedure to select a cell when reconnecting to the PS network.

For example, in one aspect, a user equipment (UE) may be connected or camped in a cell in a PS (e.g., LTE) network. When the UE receives a request, such as a call request, that requires the UE to connect to the CS network, the UE may perform a CSFB procedure to connect to the CS network to respond to the request. Before performing the CSFB, the UE may record the serving frequency and/or serving cell the UE used in the PS network. Once the UE is connected and subsequently released from the CS network, the UE may be released without redirection information. In such instances, the UE may perform a blind fast return to the PS network. In the blind fast return procedure, the UE may perform a full power scan on all of the serving frequencies of the PS network and may choose a plurality of candidate serving frequencies based on the full power scan. In another example, a VOLTE UE may leave an LTE coverage area. If the UE is in a call session, the PS VOLTE call may be subject to handover to a 2G/3G network, with the call being converted to a CS call. After the CS call is released from the 2G/3G network, the UE may perform a blind fast return to the PS network. Before performing the handover, the UE may record the serving frequency and/or serving cell the UE used in the PS network.

In instances where the previously-recorded serving frequency is among the candidate frequencies, the UE may perform an acquisition procedure on the recorded serving frequency and select a cell using the recorded serving frequency. In an aspect, the UE may refrain from selecting a cell if none of the cells serving the selected frequency have a high enough quality, as measured by their respective signal-to-noise ratios (SNRs). In instances where the previously-recorded serving frequency is not among the candidate frequencies, the UE may perform an acquisition procedure on one or more of the candidate frequencies and may select a cell with the highest SNR. Once the UE selects a cell, the UE may perform a cell selection procedure to connect to the selected cell.

FIG. 1 is a diagram illustrating LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
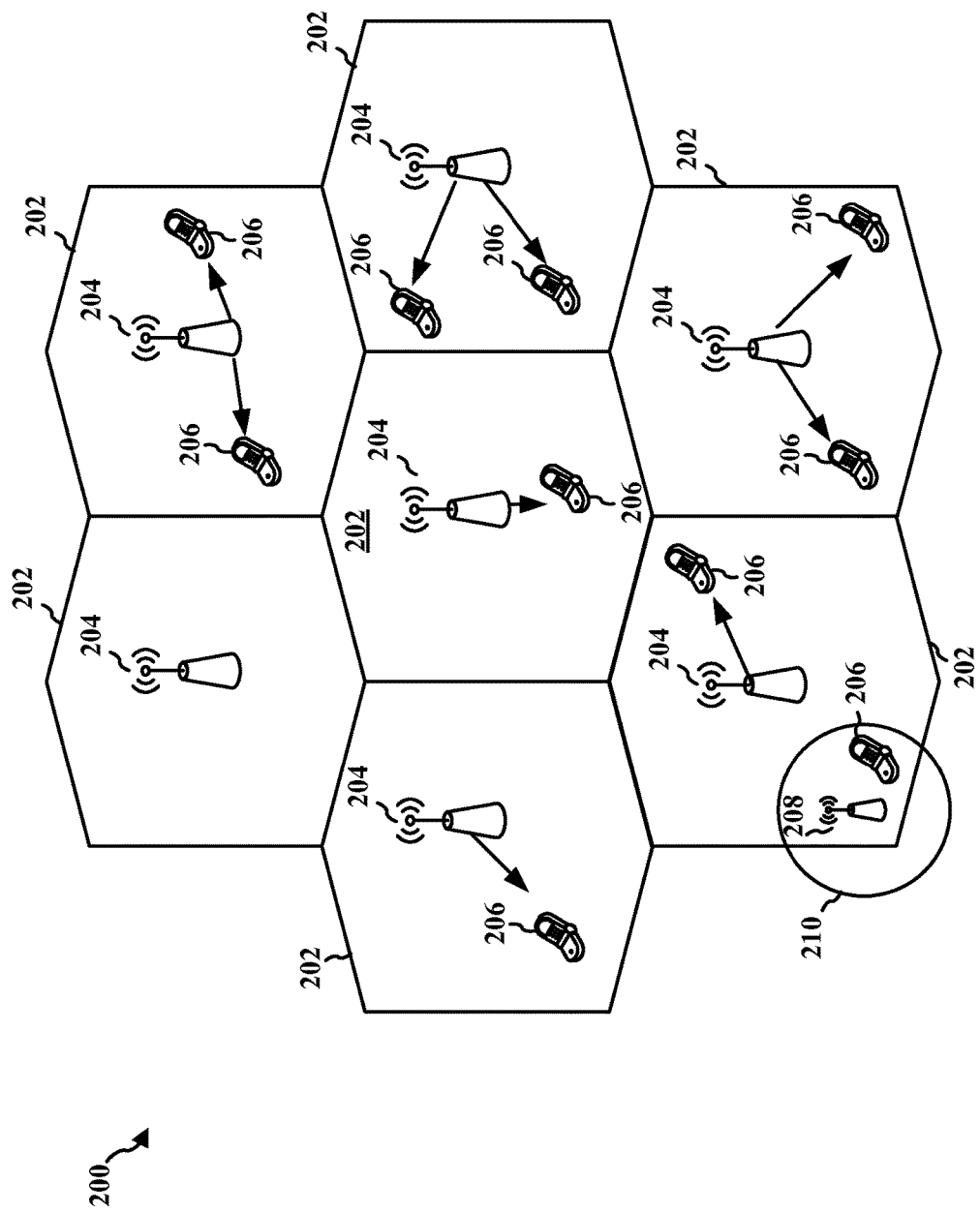
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
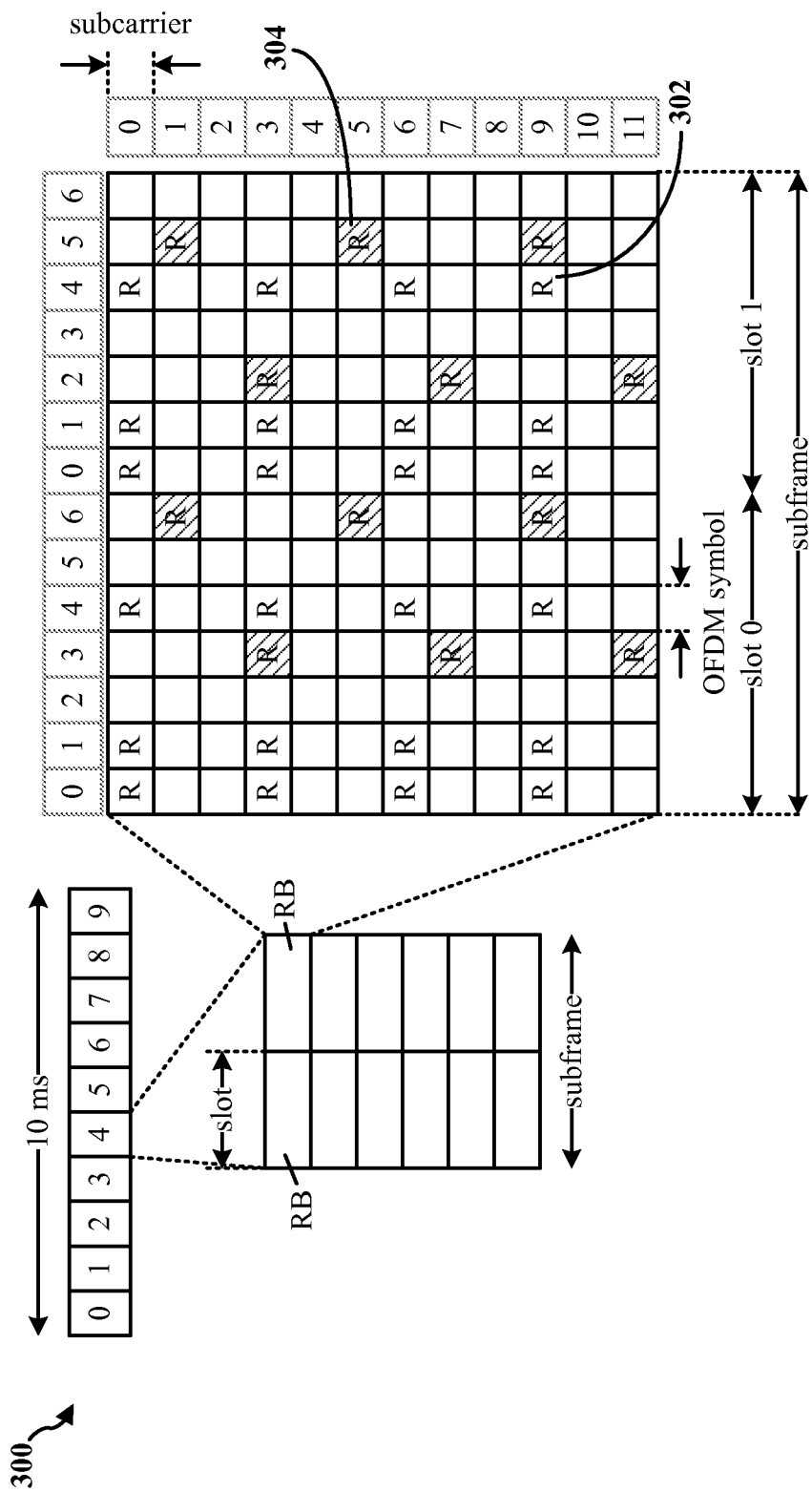
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
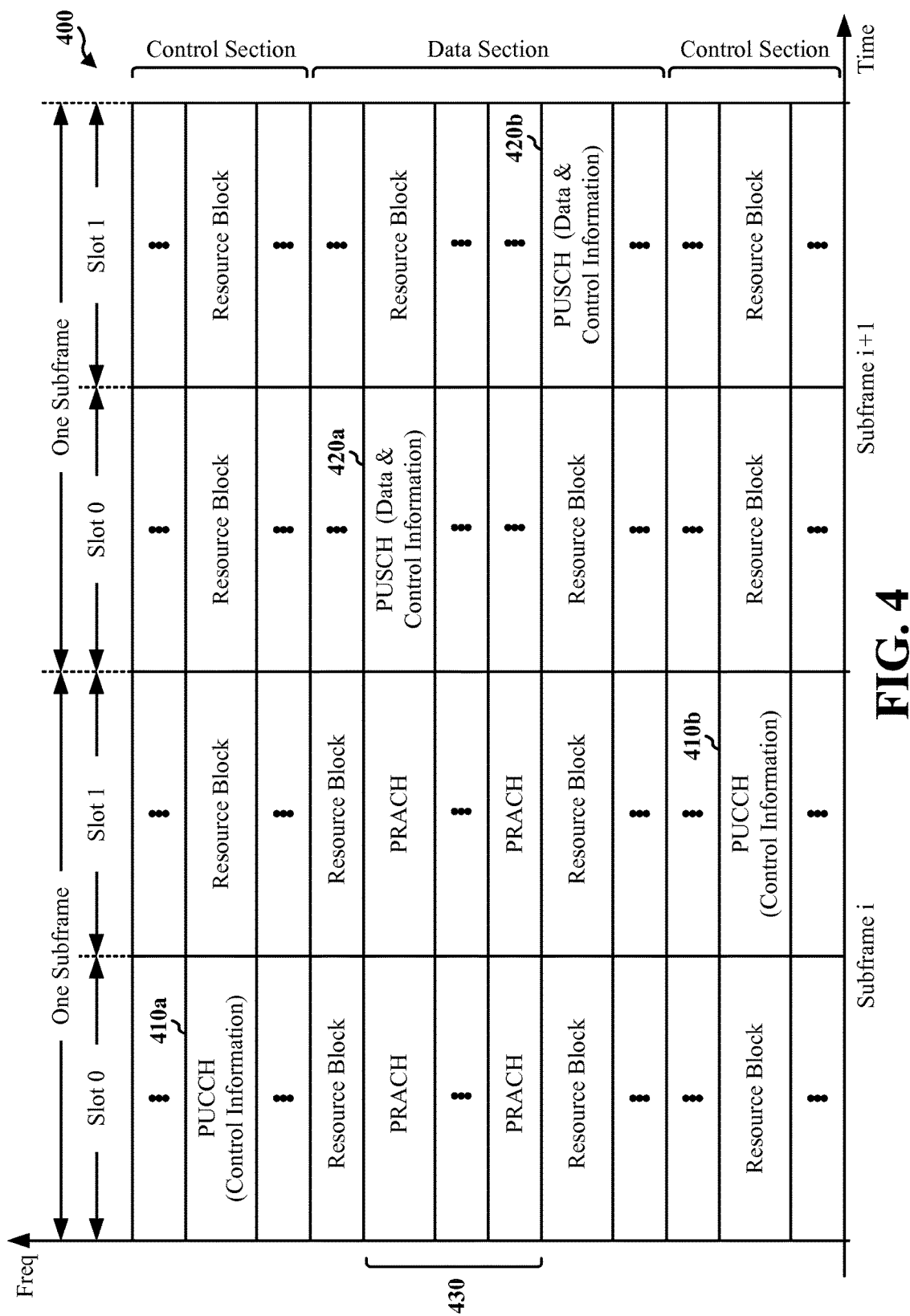
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
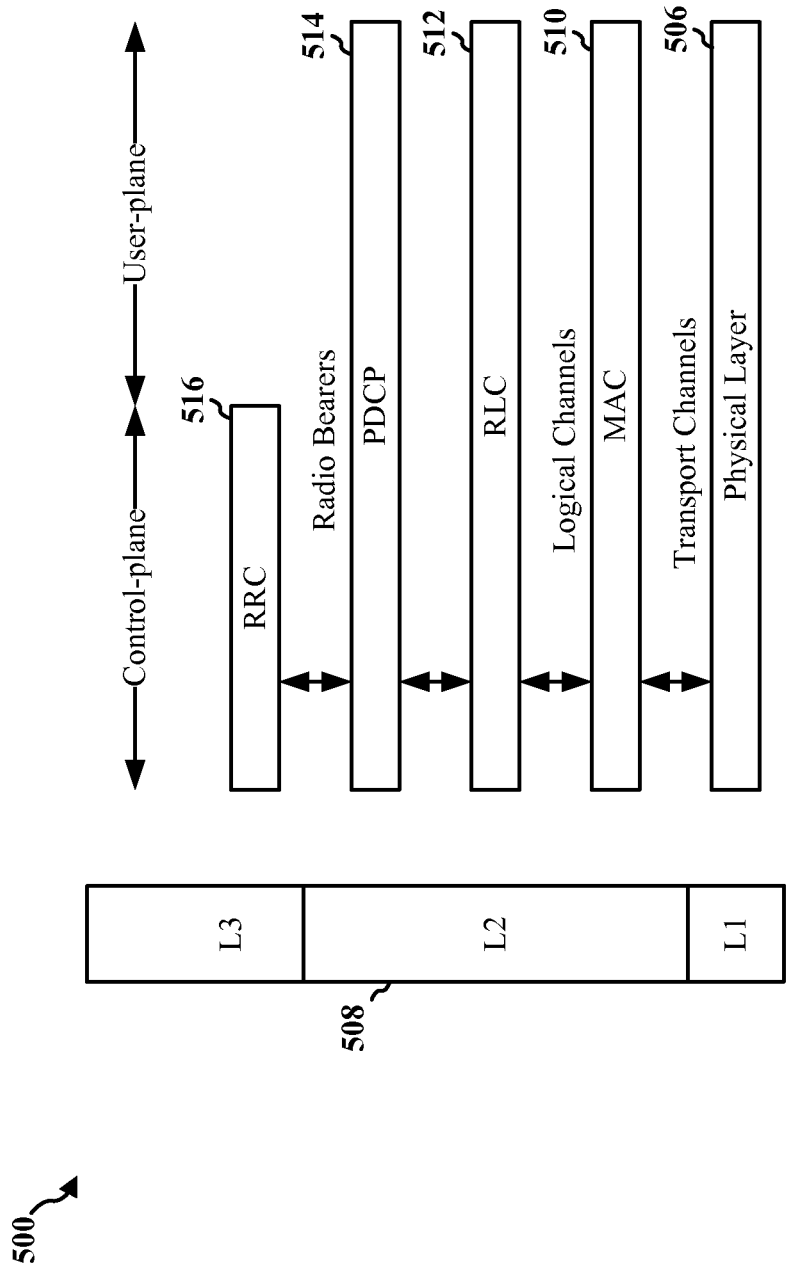
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
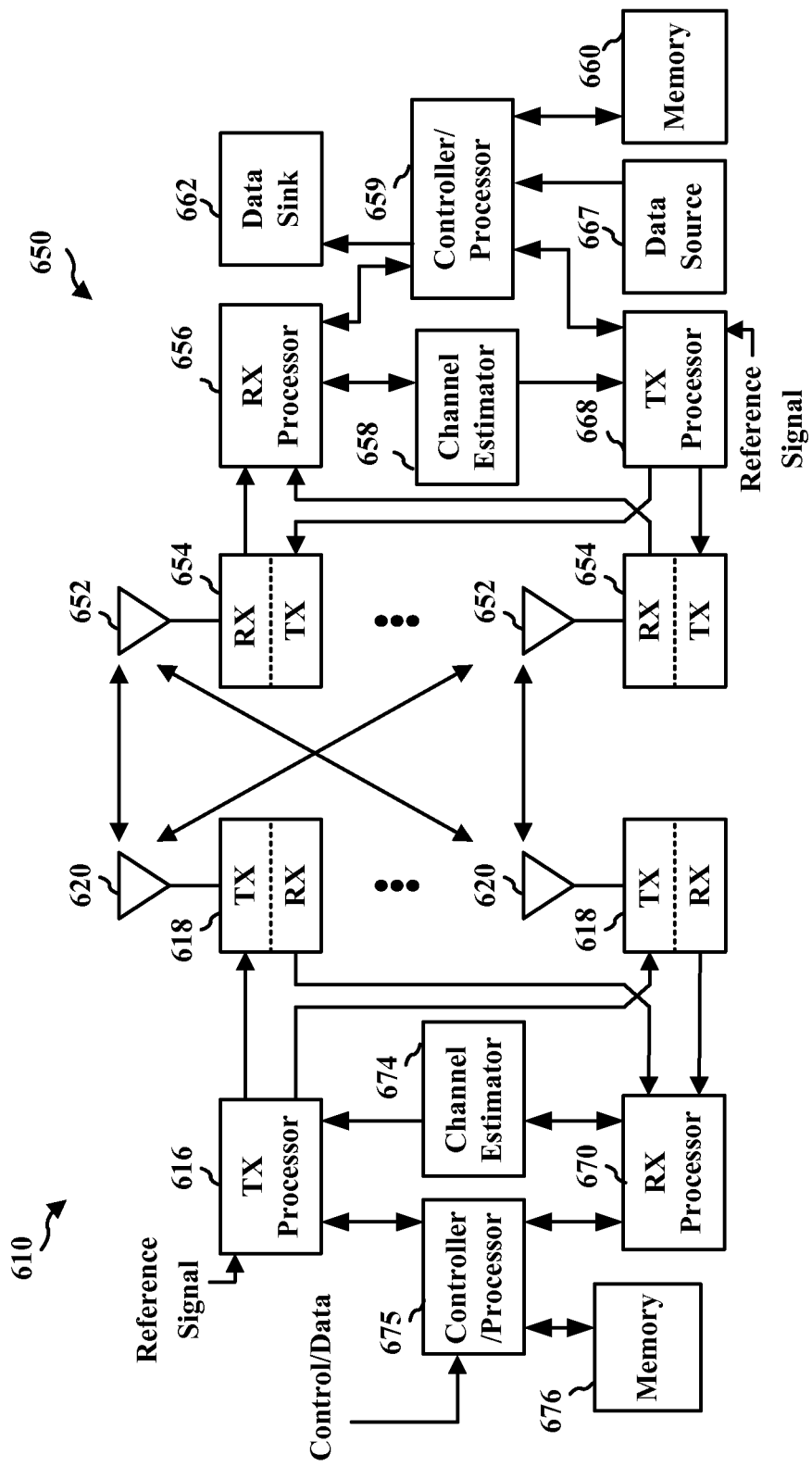
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
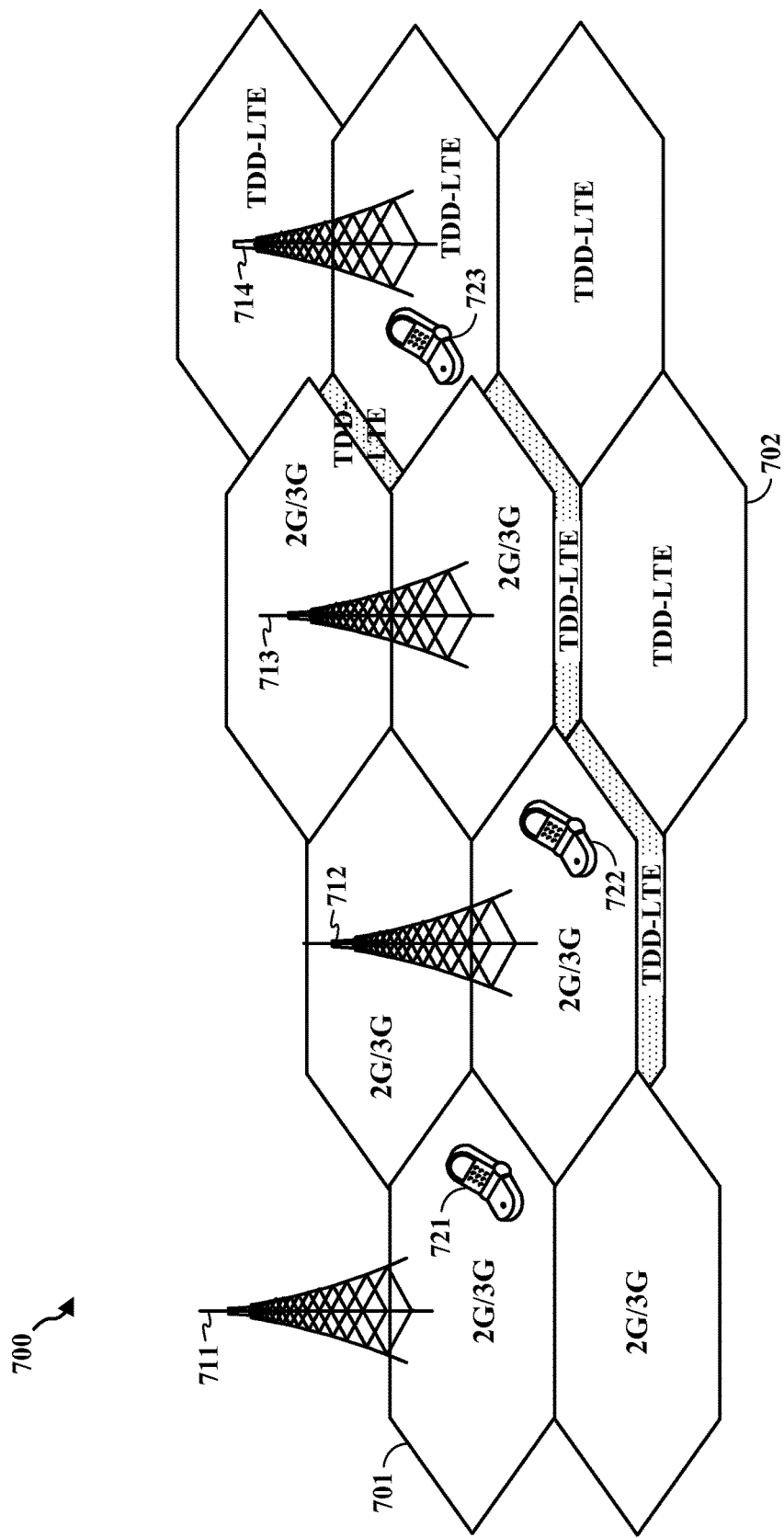
FIG. 7 is a diagram illustrating a mixed network that includes coverage areas of a packet-switched network and a circuit-switched network.

FIG. 7 is a diagram illustrating a mixed network that includes coverage areas of a packet-switched network and a circuit-switched network. The mixed network 700 includes areas where there is dual coverage between a circuit-switched (CS) network (e.g., a 2G/3G network) and a packet-switched (PS) network (e.g., an LTE network), and areas where there is only coverage of the individual networks. Base stations 711-714 operate node Bs for the CS network 701 and eNodeBs for the PS network 702. For example, base station 711 may operate a single node B for CS network 701, while base station 714 may operate a single eNodeB for PS network 702. Base stations 712 and 713 may each operate one node B for the CS network 701 and an eNodeB for PS network 702. UEs, such as UE 722 within the coverage area of base station 712, may connect for communication through both or either of CS network 701 and PS network 702, while UEs such as UEs 721 and 723 within the coverage areas of the base stations 711 and 714, respectively, would only be able to connect for communication through either CS network 701 (for UE 721 through the base station 711) or PS network 702 (for UE 723 through the base station 714).

In order for a UE, such as UE 722, to connect to both CS network 701 and PS network 702, the UE includes both hardware and software enabling it to establish communication with the protocols of both CS and PS technologies. For example, the UE can include modules, such as a frequency selection module and a cell selection module, to select a base station 711-714 based on criteria like cell power and signal quality.

Blind redirection may be used, for load balancing and for transition procedures (e.g., CSFB, SRVCC) from a PS network to other radio access technologies (RATs), such as TD-SCDMA, UMTS FDD, UMTS TDD, and GSM. Generally, operators may have three or more RATs deployed. For example, in the deployments of LTE, some voice service will fall back to other RATs for circuit-switched voice services. 3GPP standards have supported procedures to allow the voice call being set up when the UE is communicating with the LTE network, whether in idle or connected mode. Inter-RAT redirection may be blind or non-blind. Blind redirection occurs without knowledge of the radio conditions of the other technology. One advantage of blind redirection is that redirection may be executed quickly without additional measurements.

CSFB is a feature that enables multimode UEs that are capable of communication with the CS network and the PS network, to obtain circuit-switched voice services while being camped on a PS network. A CSFB-capable UE may initiate a mobile-originated (MO) circuit-switched (CS) voice call while the UE is communicating with the PS network. The initiation results in the UE being moved to a CS-capable RAT for a CS voice call setup. A CSFB-capable UE may be paged for a mobile-terminated (MT) voice call while the UE is communicating with the PS network, resulting in the UE being moved to the CS network for circuit-switched voice call setup. Upon completion of a circuit-switched voice call, the UE returns to the LTE network for high-speed data transactions. Similarly, Single Radio Voice Call Continuity (SRVCC) is a feature that enables UEs capable of communication with the CS and PS networks to handover CS calls when the UE roams out of the PS coverage area.

Figure 8:
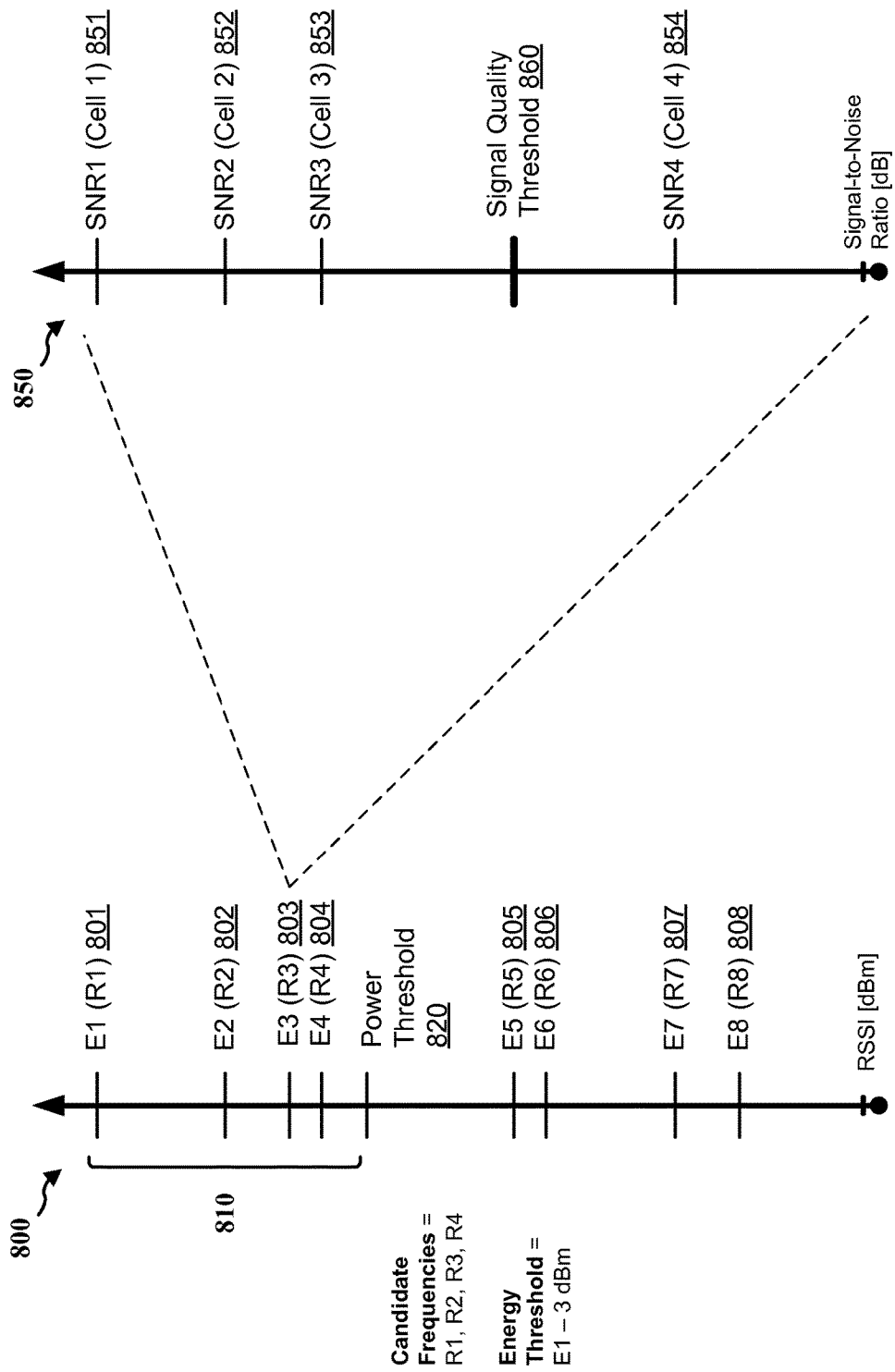
FIG. 8A is a diagram of a measurement of power levels of frequencies of a radio access network.
FIG. 8B is a diagram of a measurement of signal-to-noise ratio (SNR) values of cells of a radio access network.

FIG. 8A is a diagram of a measurement of power levels of frequencies of a radio access network. In an aspect, a UE, such as UE 722, can perform a power scan of frequencies in the PS network. For example, diagram 800 illustrates a 1-D graph of the power levels of a plurality of frequencies for a PS network, measured in Decibel-milliwatts (dBm). During the power scan, the UE may measure the electric power for each frequency in the PS network. For example, the UE may perform a power scan of LTE frequencies and may measure received signal strength indicators (RSSIs) for each serving LTE frequency. In an aspect, each of the serving LTE frequencies can be identified by the UE by an enhanced absolute radio frequency channel number (EARFCN).

In the illustrative embodiment, for example, diagram 800 illustrates the measured power levels 801-808 of eight frequencies for a measured network. For example, the UE may perform a full power scan of an LTE network and receive power measurements of eight LTE frequencies. Here, "E1" can represent the measured RSSI of a frequency, with "R1" representing the EARFCN of the frequency. While measured power levels 801-808 are listed in order of R1-R8, the frequencies may not be sequential (e.g., R1 may be 2.4 Ghz, R2 may be 5 GHz, and R3 may be 800 MHz).

In an aspect, the UE may generate a list of candidate frequencies based on the full power scan. For example, the UE may set a power threshold and may generate a list of candidate frequencies when their corresponding measured powers are above the set threshold. In an aspect, the threshold may be set from a predetermined value. In another aspect, the threshold can be set based on a measured power of a PS frequency. For example, the UE may measure the power of all the frequencies for the PS network. The UE may then set the power threshold as a value below the highest-measured power level. For example, the UE may measure the highest-measured power level 801 and may set the power threshold 810 as a value below the highest power level (e.g., power threshold is equal to E1(R1)-3 dBm).

Candidate list 820 can include each frequency that has a corresponding power level that the UE measures above the power threshold 810. For example, candidate list 820 includes frequencies R1 801, R2 802, R3 803 and R4 804, as each of their corresponding measured power levels (E1-E4) were above the power threshold 810. In an aspect, the UE may perform acquisition and/or cell selection procedures for one or more of the frequencies populating candidate list 820 to select a cell with which to connect to the PS network. In an aspect, if the UE is unable to connect to any cell operating at one of the candidate frequencies, the UE may perform a cell selection procedure to select a cell in the CS network.

In an aspect, the UE may have saved information identifying the frequency and/or cell to which it was connected in the PS network before performing the CSFB/SRVCC procedure. In such instances, the UE may determine whether any of the frequencies included in candidate list 820 have information that matches the identifying information saved by the UE. If so, the matching frequency is the previous serving frequency and the UE initially performs the acquisition procedure on the previous serving frequency, even if the previous serving frequency did not have the highest-measured power level. When the previous serving frequency does not match any of the candidate frequencies, the UE may initially perform the acquisition procedure on the serving frequency associated with the highest measured power level.

FIG. 8B is a diagram of a measurement of signal-to-noise ratio (SNR) values of cells of a radio access network. For example, diagram 850 illustrates a 1-D graph of measured signal-to-noise ratio (SNR) values 851-854 for a plurality of cells (e.g. cells 1-4), measured in decibels (dB). In an aspect, the UE can measure the signal-to-interference-plus-noise ratio (SINR) of a plurality of cells. In an aspect, a UE, such as UE 722, can perform an acquisition procedure (e.g., cell acquisition) by measuring signal quality of a plurality of candidate cells. In an aspect, the plurality of candidate cells can all operate at a common serving frequency included in the candidate list 820. In an aspect, the UE may perform the acquisition procedure multiple times for a plurality of serving frequencies. If the UE determines that at least one cell has an acceptable signal quality (e.g., a SNR above signal quality threshold 860), the UE may select a cell to return to the PS network. In an aspect, when the UE determines that multiple cells have signal qualities above the signal quality threshold 860, the UE may select the cell with the highest signal quality among the plurality of cells.

In an aspect, the UE may select a cell based on its measured signal quality. For example, in an aspect, the UE may use a predetermined signal quality value (e.g., 0 dB) for signal quality threshold 860. In an aspect, the UE may select any cell with a signal quality above signal quality threshold 860; if all the candidate cells have measured signal qualities below signal quality threshold 860, the UE may refrain from selecting any of the candidate cells and may perform another acquisition procedure, measuring candidate cells at another candidate frequency. In an aspect, if the UE exhausts all possible cells from all candidate frequencies and remains unable to find an acceptable cell (or if an aborting timer expires), the UE may perform a cell selection procedure on the CS RAT and may select a cell in the CS network.

In the illustrative embodiment, for example, the UE measures the signal qualities of cells 1-4 operating at serving frequency R3. In an aspect, the selected serving frequency R3 may be the serving frequency saved by the UE before performing the CSFB/SRVCC procedure. Cells 1-3 have signal-quality values SNR1 851, SNR 2 852, and SNR3 853 that are all above signal quality threshold 860, while cell 4 has a signal-quality value SNR4 854 that is below signal quality threshold. In an aspect, the UE may select any of cells 1-3 and may initially select cell 1 because it has the highest measured signal quality. In instances where the UE is unable to connect to cell 1, the UE may try to connect to cells 2 and 3 before performing a cell acquisition procedure at another serving frequency R1, R2, and/or R4. In an aspect, the UE may attempt selection of one or more cells while an abort timer has not yet expired; if the abort timer expires, the UE may then attempt cell selection in the CS network.

Figure 9:
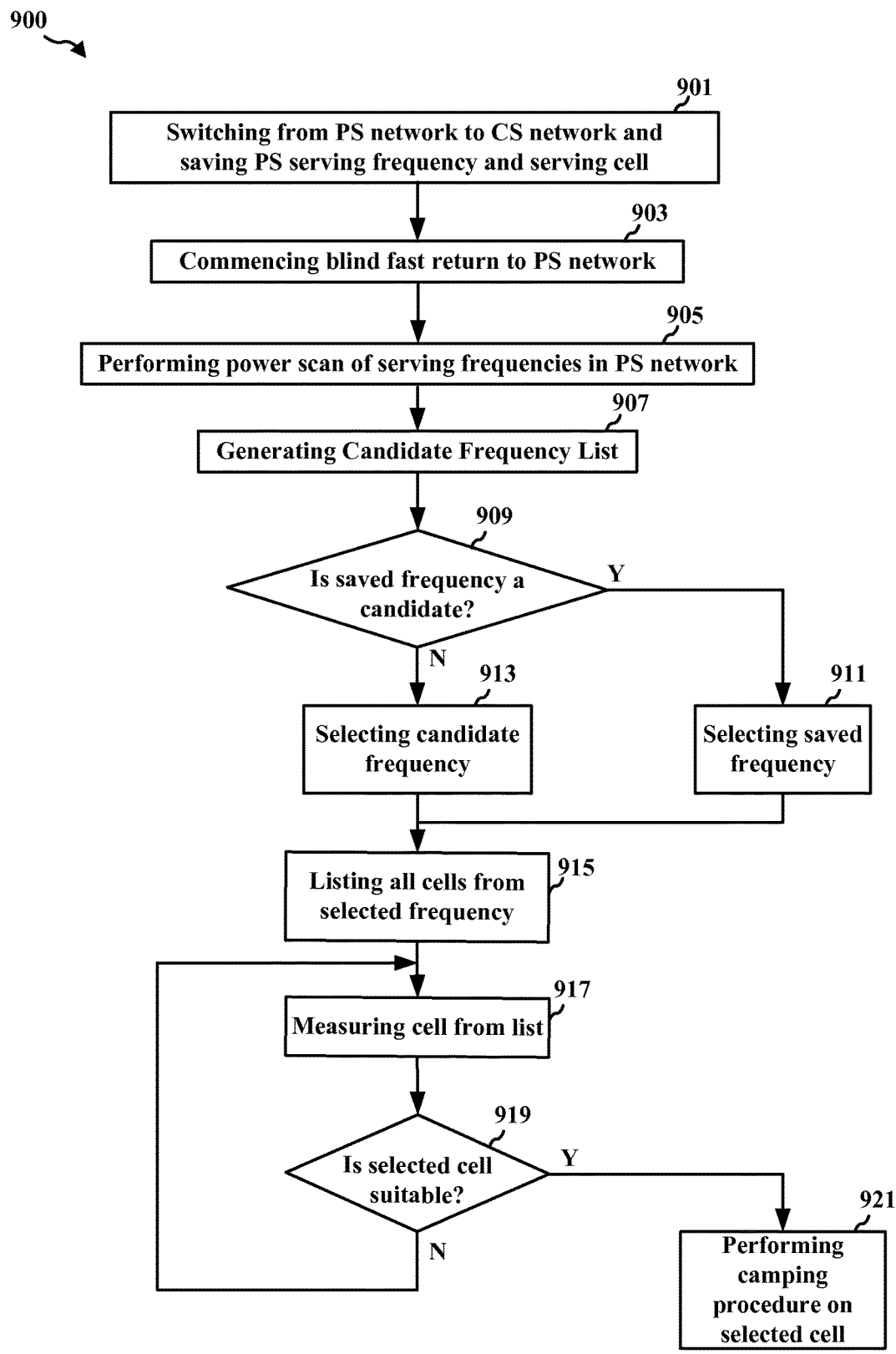
FIG. 9 is a flowchart illustrating an example method of blind fast return using SNR values.

FIG. 9 is a flowchart of a method of wireless communication. The method may be performed by a UE (e.g., the UE 722, the apparatus 1002/1002') when moving from the PS network to the CS network and returning from the CS network. As will be further discussed below in relation to FIGS. 10-11, various modules 1004-1016, including reception module 1004, signal quality measurement module 1006, cell selection module 1008, transmission module 1010, power measurement module 1012, candidate generation module 1014, and frequency selection module 1016 of UE 1002 can perform one or more steps of method 900.

Method 900 can begin at block 901, which includes switching from a PS network to a CS network. For example, in an aspect, UE 722 can be camped on a PS network that uses a radio access technology (RAT) like LTE. In an aspect, UE 722 may switch from the PS network to the CS network using a CSFB or SRVCC procedure, based on the initial connection of the call and the availability of the PS network. For the CSFB procedure, for example, reception module 1004 of UE 722 may, for example, originate a mobile-originated (MO) call in the CS network or may receive a paging indication in the PS network regarding an incoming mobile-terminated (MT) call in the CS network, of which UE 722 is an intended recipient. In an aspect, the CS network can use a RAT such as UMTS/CDMA. UE 722 can then use frequency selection module 1016 and cell selection module 1008 to establish a connection in the CS network using the CSFB procedure to handle the MO/MT call. In an aspect, UE 722 may use frequency selection module 1016 and/or cell selection module 1008 to select a cell in the CS network. In an aspect, UE 722 can perform an SRVCC procedure when a call is established in the PS network and UE 722 moves outside of the coverage area of the PS network. UE 722 can then use frequency selection module 1016 and cell selection module 1008 to establish a connection in the CS network using the SRVCC procedure to handle the call.

In an aspect, method 900 at block 901 may also include saving the serving frequency and serving cell on which it is camped in the PS network. In an aspect, the UE 722 may save an identifier of the serving frequency and/or the serving cell as one or move values in its memory. In an aspect, the UE may save the serving frequency and/or serving cell identifiers when first connecting to the cell. In an aspect, the UE may, for example, use frequency selection module 1016 to save in its memory the enhanced absolute radio frequency channel number (EARFCN) of a serving frequency and may use cell selection module 1008 to save, for example, a global or physical Cell ID (CID) of the serving cell.

At block 903, method 900 may also include commencing blind fast return to the PS network. In an aspect, for example, UE 722 can end the call session for the MO/MT call and begin to reestablish a connection in the PS network. In an aspect, UE 722 can return to the coverage area of the PS network (e.g., during a SRVCC procedure) that triggers a return to the PS network. In an aspect, reception module 1004 of UE 722 may receive a connection release message from a Node B in the CS network; the connection release message may be absent of any PS network redirection information, such as a neighbor cell list for the PS network. Without redirection information, UE 722 may perform a blind fast return procedure to connect to a cell using the LTE RAT in the PS network.

At block 905, method 900 may also include performing a power scan of serving frequencies in the PS network. For example, in an aspect, power measurement module 1012 of UE 722 can perform a power scan of frequencies serving the LTE RAT and may measure the power levels of the LTE serving frequencies. In an aspect, UE 722 may receive power levels of one or more serving frequencies of a RAT in the PS network. In an aspect, a power scan of a serving frequency can take approximately 60 ms. For example, UE 722 may take 10 5-ms samples, with an additional overhead of 10 ms. In an aspect, power measurement module 1012 can average the samples to determine a single power level for a measured serving frequency. In an aspect, the measured power level can be a receive strength signal indicator (RSSI) of the frequency and may be measured in decibel-milliwatts (dBm).

At block 907, method 900 may also include generating a candidate frequency list. For example, in an aspect, candidate generation module 1014 of UE 722 can receive the frequencies and associated measured power levels from power measurement module 1012 and may generate a list of candidate serving frequencies based on the associated measured power levels. In an aspect, for example, candidate generation module 1014 can calculate power threshold 810 based on the measured power levels. For example, candidate generation module 1014 can determine the highest-measured power level and calculate power threshold 810 as a predetermined level (e.g., 3 dBm) below the highest-measured power level. In an aspect, candidate generation module 1014 can evaluate each frequency by comparing each of the measured power levels against power threshold 810; when a measured power level is above the threshold, candidate generation module 1014 can populate a candidate frequency list with the associated serving frequency. In an aspect, UE 722 may save candidate frequencies by their respective EARFCNs. In an aspect, the candidate frequency list can be a predetermined length N (e.g., where N=3) and candidate generation module 1014 can end comparisons of measured power levels of frequencies to power threshold 810 once the candidate frequency list is full.

At block 909, method 900 may also include determining whether the saved serving frequency is a candidate frequency. In an aspect, once the candidate frequency list is complete, frequency selection module 1016 of UE 722 can, for example, compare each frequency in the candidate frequency list against the saved serving frequency. For example, in an aspect, UE 722 may have saved frequency R3 at block 901 before performing the CSFB/SRVCC procedure. As the R3 serving frequency had an associated power level of E3 803 that was above power threshold 810, UE 722 added R3 to the candidate frequency list. UE 722 may then compare each candidate frequency in the candidate frequency list, {R1, R2, R3, R4} against the saved serving frequency. When UE 722 finds a match and determines that there the saved serving frequency was on the candidate list, UE 722 may proceed to block 911; otherwise, when UE 722 does not find a match and determines that the saved serving frequency was not on the candidate list, UE 722 may proceed to block 913.

At block 911, method 900 may also include selecting the saved frequency. In an aspect, for example, frequency selection module 1016 of UE 722 can, upon determining that the saved serving frequency was included in the candidate frequency list, select the saved serving frequency. In an aspect, UE 722 can select the saved serving frequency even when the saved serving frequency is not associated with the highest-measured power level. Once selected, UE 722 may perform a cell acquisition procedure on cells operating at the saved serving frequency; if UE 722 is unable to select a cell operating at the saved serving frequency (e.g., all cells at the saved serving frequency had signal qualities below signal quality threshold 860), UE 722 may optionally return to block 913 to select another frequency from the candidate frequency list. In an aspect, if an abort timer expires before UE 722 can select a cell, UE 722 can perform a cell acquisition procedure at a serving frequency in the CS network.

At block 913, method 900 may also include selecting a candidate frequency. In an aspect, frequency selection module 1016 of UE 722 can, upon determining that the saved serving frequency was not included in the candidate frequency list, select a serving frequency from the candidate frequency list. In an aspect, frequency selection module 1016 may select the serving frequency associated with the highest-measured power level. For example, frequency selection module can, given candidate frequency list {R1, R2, R3, R4} initially select serving frequency R1, as it is associated with the highest-measured power level E1 801. Once selected, UE 722 may perform a cell acquisition procedure on cells operating at the selected serving frequency; if UE 722 is unable to select a cell operating at the selected serving frequency (e.g., all cells at the selected serving frequency had signal qualities below signal quality threshold 860), UE 722 may optionally return to block 913 to select another frequency from the candidate frequency list. In an aspect, if an abort timer expires before UE 722 can select a cell or if no candidate frequencies remain, UE 722 can perform a cell acquisition procedure at a serving frequency in the CS network.

At block 915, method 900 may also include listing all cells from the selected frequency. In an aspect, UE 722 may perform a cell acquisition procedure for all cells operating at the selected serving frequency (e.g., the saved serving frequency selected at block 911 or the selected serving frequency at block 913). In an aspect, the acquisition procedure may be a two-stage, primary synchronization channel/secondary synchronization channel (PSS/SSS) procedure. During the acquisition procedure, UE 722 can detect a plurality of cells; in an aspect, UE 722 may receive, for example, the CID and other information (e.g., slot boundaries, radio frame timing, etc.) of each detected cell. Once the initial acquisition procedure is complete, UE 722 may generate a list of each detected cell at the serving frequency. In an aspect, the UE 722 may save the CID for each detected cell in the cell list.

At block 917, method 900 may also include measuring a cell from the cell candidate list. For example, signal quality measurement module 1006 may, for a cell in the cell list, receive a signal quality value associated with cell operating at the selected operating frequency. In an aspect, the signal quality value may be a ratio, such as a signal-to-noise ratio (SNR), a signal-to-interference-plus-noise ratio (SINR), and/or a ratio of a reference signal received power (RSRP) to a reference signal received quality (RSRQ) of a cell. In an aspect, signal quality measurement module 1006 may receive signal quality values for each cell in the cell list. In another aspect, signal quality measurement module 1006 may receive a selected cell from cell selection module 1008 and may receive a signal quality value associated with the selected cell.

At block 919, method 900 may also include determining whether the measured cell is suitable for selection. In an aspect, cell selection module 1008 may receive a signal quality value from signal quality measurement module 1006 and may determine whether the cell associated with the received signal quality value meets at least one criterion. For example, cell selection module 1008 may compare a received signal quality value SNR1 851 to signal quality threshold 860 to determine the greater value. When the received signal quality value SNR1 851 is greater than signal quality threshold 860, UE 722 may proceed to block 921; otherwise UE 722 may return to block 917 to measure another cell in the cell list. In an aspect, if an abort timer expires before UE 722 can find a suitable cell or if no cells remain in the cell list, UE 722 can perform a cell acquisition procedure at a serving frequency in the CS network.

At block 921, method 900 may also include performing a camping procedure on the selected cell. In an aspect, cell selection module 1008 of UE 722 can find a suitable cell and select the cell. Once UE 722 selects the cell, UE 722 can then camp on the selected cell to establish connection in the PS network and obtain normal service.

Figure 10:
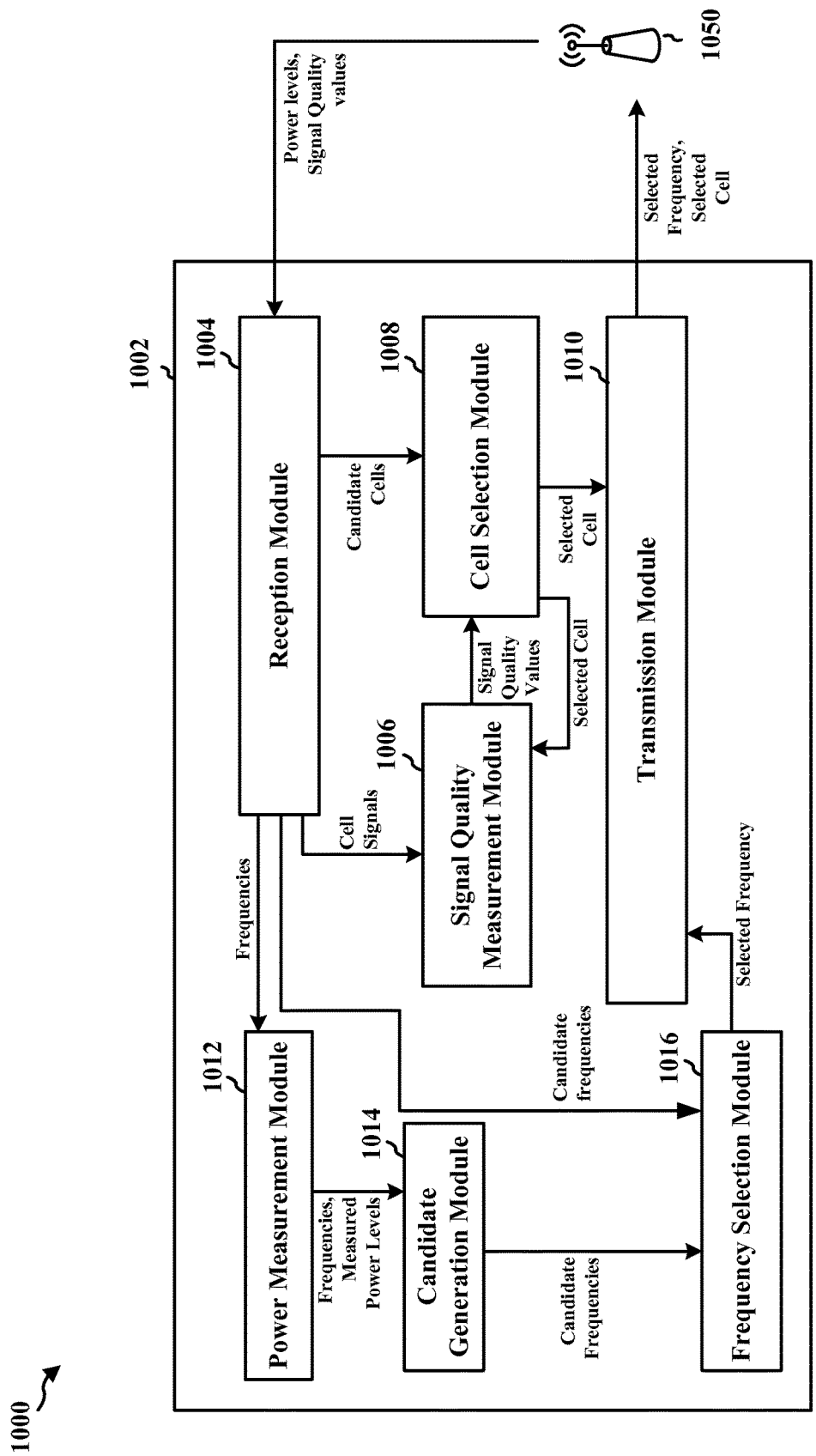
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE. The apparatus includes a reception module 1004 that receives messages from NB/eNB 1050 and transmits the messages to other modules within UE 1002. The apparatus also includes a transmission module that receives messages and/or values generated from other modules in UE 1002 and transmits messages to NB/eNB 1050.

The apparatus may include additional modules that perform each of the blocks of the algorithm in the aforementioned flowchart of FIG. 9. As such, each block in the aforementioned flowchart of FIG. 9 may be performed by one or more modules and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

UE 1002 can include signal quality measurement module 1006, which receives cell signals via reception module 1004, measures signal quality values from the received cell signals, and transmits the measured signal quality values to cell selection module 1008. In an aspect, the signal quality value may be a ratio, such as a signal-to-noise ratio (SNR), a signal-to-interference-plus-noise ratio (SINR), and/or a ratio of a reference signal received power (RSRP) to a reference signal received quality (RSRQ) of a cell.

UE 1002 can include cell selection module 1008 that receives a candidate cells and selects a cell to connect to a network via a RAT. For example, when performing a CSFB/SRVCC procedure, UE 1002 can use cell selection module 1008 to select a serving cell in the CS network to camp on to connect to the CS RAT and handle the MO/MT call. In an aspect, cell selection module 1008 can receive a cell list from and may select a cell from the cell list. In an aspect, the selected cell can be transmitted to signal quality measurement module 1006 to perform measurements on the selected cell. In an aspect, cell selection module 1008 can determine whether a cell is suitable and select a cell for camping; the selected cell can be transmitted to transmission module 1010 such that UE 1002 can perform camping procedures on the selected cell.

UE 1002 can include power measurement module 1012, which receives signal frequencies from reception module 1004 and can perform power measurements on the received signal frequencies. In an aspect, power measurement module 1012 can perform a power scan of frequencies serving a RAT and may measure the power levels of the RAT-serving frequencies. In an aspect, power measurement module 1012 may receive power levels of one or more serving frequencies of a RAT in the RAN. In an aspect, a power scan of a serving frequency can take approximately 60 ms. For example, power measurement module 1012 may take 10 5-ms samples, with an additional overhead of 10 ms. In an aspect, power measurement module 1012 can average the samples to determine a single power level for a measured serving frequency. In an aspect, the measured power level can be a receive strength signal indicator (RSSI) of the frequency.

UE 1002 can include candidate generation module 1014 that may receive a plurality of serving frequencies and their associated measured power levels and may determine whether one or more serving frequencies are candidates for camping. In an aspect, for example, candidate generation module 1014 can calculate a power threshold based on the measured power levels. For example, candidate generation module 1014 can determine the highest-measured power level and calculate a power threshold as a predetermined level (e.g., 3 dBm) below the highest-measured power level. In an aspect, candidate generation module 1014 can evaluate each frequency by comparing each of the measured power levels against the power threshold; when a measured power level is above the threshold, candidate generation module 1014 can populate a candidate frequency list with the associated serving frequency. In an aspect, candidate generation module 1014 may save candidate frequencies by their respective EARFCNs. In an aspect, the candidate frequency list can be a predetermined length N (e.g., where N=3) and candidate generation module 1014 can end comparisons of measured power levels of frequencies to the power threshold once the candidate frequency list is full.

UE 1002 can include frequency selection module 1016, which may receive a plurality of candidate frequencies from reception module 1004 or candidate generation module 1014 and may select a frequency from the candidate frequencies. For example, UE 1002 can use frequency selection module 1016 to select a serving frequency in the CS network to camp on to connect to the CS RAT and handle the MO/MT call. In an aspect, when performing the blind fast return procedure, frequency selection module 1016 of can, for example, compare each frequency in the candidate frequency list against the saved serving frequency. When frequency selection module 1016 finds a match and determines that there the saved serving frequency was on the candidate list, frequency selection module 1016 may select the saved frequency and transmit the selected frequency to transmission module 1010 so that UE 1002 can commence the PSS/SSS initial acquisition procedure. When frequency selection module 1016 does not find a match and determines that there the saved serving frequency was not on the candidate list, frequency selection module 1016 may select a frequency and transmit the selected frequency to transmission module 1010 so that UE 1002 can commence the PSS/SSS initial acquisition procedure. In an aspect, frequency selection module 1016 can select the frequency associated with the highest-measured power level. In an aspect, if an abort timer expires before UE 722 can select a cell, UE 722 can perform a cell acquisition procedure at a serving frequency in the CS network.

Figure 11:
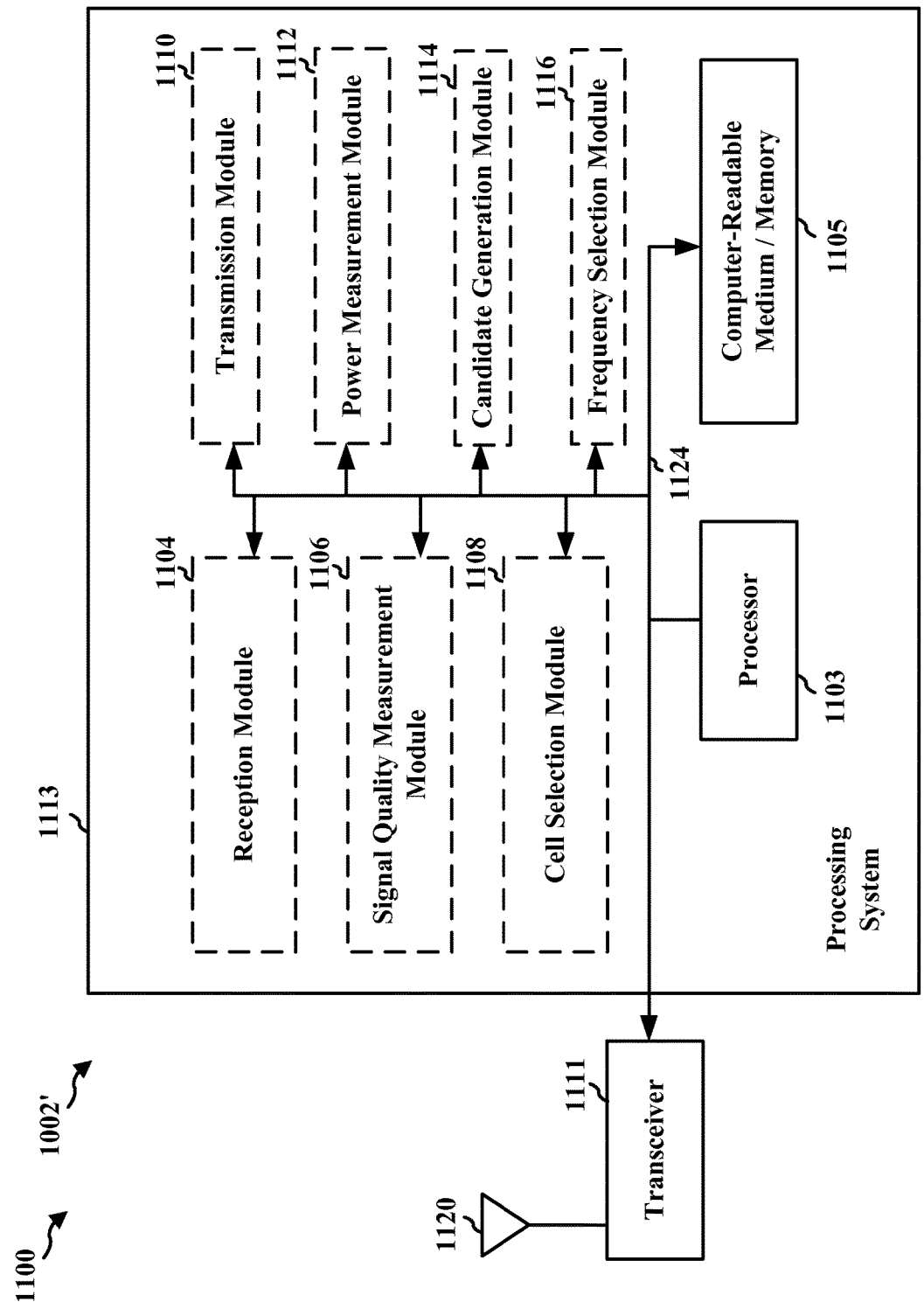
FIG. 11 is a diagram illustrating an example of a hardware implementation for an apparatus employing a processing system.

FIG. 11 is a diagram 1100 illustrating an example of a hardware implementation for an apparatus 1002' employing a processing system 1113. Processing system 1113 may be implemented with a bus architecture, represented generally by the bus 1124. Bus 1124 may include any number of interconnecting buses and bridges, depending on the specific application of processing system 1113 and overall design constraints. Bus 1124 links together various circuits, including one or more processors and/or hardware modules, represented by the processor 1103, the modules 1104, 1106, 1108, 1110, 1112, 1114, and 1116, and the computer-readable medium/memory 1105. Bus 1124 may also link various other circuits, such as timing sources, peripherals, voltage regulators, and power management circuits, which are well known in the art, and therefore, will not be described any further.

Processing system 1113 may be coupled to a transceiver 1111. Transceiver 1111 is coupled to one or more antennas 1120. Transceiver 1111 provides a means for communicating with various other apparatus over a transmission medium. Transceiver 1111 receives a signal from the one or more antennas 1120, extracts information from the received signal, and provides the extracted information to processing system 1113, specifically reception module 1104. In addition, transceiver 1111 receives information from the processing system 1113, specifically the transmission module 1110, and based on the received information, generates a signal to be applied to the one or more antennas 1120.

Processing system 1113 includes one or more processors 1103 coupled to a computer-readable medium/memory 1105. Processor 1103 is responsible for general processing, including the execution of software stored on the computer-readable medium/memory 1105. The software, when executed by processor 1103, causes the processing system 1113 to perform the various functions described supra for any particular apparatus. Computer-readable medium/memory 1105 may also be used for storing data that is manipulated by the processor 1103 when executing software.

Processing system 1113 further includes at least one of the modules 1104, 1106, 1108, 1110, 1112, 1114, and 1116. The modules may be software modules running in the processor 1103, resident/stored in the computer-readable medium/memory 1105, one or more hardware modules coupled to the processor 1103, or some combination thereof. Processing system 1113 may be a component of the UE 650 and may include the memory 660 and/or at least one of the TX processor 668, the RX processor 656, and the controller/processor 659.

In one configuration, apparatus 1002/1002' for wireless communication includes means for switching the UE operating at a first signal frequency in a first RAN to a second RAN, means for switching the UE from the second RAN back to the first RAN, means for determining whether one or more signal parameters from one of the cells fails to satisfy a criterion, means for selecting a cell using the second RAN, means for measuring a receive strength signal indicator (RSSI), means for generating a list of candidate cells that have a measured RSSI above the power threshold, and means for switching to a cell on the candidate cell list if its SNR or SINR is above a signal quality threshold.

The aforementioned means may be one or more of the aforementioned modules of the apparatus 1002 and/or the processing system 1113 of apparatus 1002' configured to perform the functions recited by the aforementioned means. As described supra, processing system 1113 may include TX Processor 668, RX Processor 656, and controller/processor 659. As such, in one configuration, the aforementioned means may be TX Processor 668, RX Processor 656, and controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of switching between a first radio access network (RAN) using a first radio access technology (RAT) and a second RAN using a second RAT different from the first RAT, the method comprising:
    switching a wireless device operating at a first signal frequency in the first RAN to the second RAN; and
    switching the wireless device from the second RAN back to the first RAN, including measuring, for a plurality of channel frequencies, a receive strength signal indicator (RSSI), generating a list of candidate cells in the first RAN that have a measured RSSI above a power threshold, and switching to a cell on the candidate cell list if its signal-to-noise ratio (SNR) or signal-to-interference-plus-noise ratio (SINR) is above the quality threshold,
        wherein the wireless device is switched to one of the cells operating at the first signal frequency in the first RAN if each of one or more signal parameters from the one of the cells satisfies a criterion, and wherein the wireless device is otherwise switched to another one of the cells operating at a second signal frequency in the first RAN based on one or more parameters from the another one of the cells, wherein the first signal frequency is different from the second signal frequency.

2. The method of claim 1, wherein the one or more signal parameters satisfies a criterion comprises at least one of:
    a cell signal strength above a power threshold; and
    an SNR or an SINR value above a quality threshold.

3. The method of claim 2, wherein the SNR or SINR is based on a ratio of a reference signal received power (RSRP) to a reference signal received quality (RSRQ).

4. The method of claim 1, wherein the second RAN comprises a circuit-switching (CS) network.

5. The method of claim 1, further comprising:
    switching the wireless device from the first RAN back to the second RAN when the wireless device is unable to connect to a cell operating at the second signal frequency in the first RAN based on one or more parameters from another one of the cells, the switching comprising:
        determining that one or more signal parameters from the another one of the cells fails to satisfy the criterion; and
        selecting a cell using the second RAN.

6. The method of claim 1, wherein the first RAN comprises a packet-switching (PS) network.

7. The method of claim 1, wherein the first signal frequency comprises an enhanced absolute radio frequency channel number (EARFCN).

8. The method of claim 1, wherein switching a wireless device operating at a first signal frequency in a first RAN to a second RAN further comprises:
saving the first signal frequency.

9. An apparatus for switching between a first radio access network (RAN) using a first radio access technology (RAT) and a second RAN using a second RAT different from the first RAT, the apparatus comprising:
means for switching a wireless device operating at a first signal frequency in the first RAN to the second RAN;
means for measuring, for a plurality of channel frequencies, a receive strength signal indicator (RSSI);
means for generating a list of candidate cells in the first RAN that have a measured RSSI above a power threshold;
means for switching to a cell on the candidate cell list if its signal-to-noise ratio (SNR) or signal-to-interference-plus-noise ratio (SINR) is above a quality threshold; and
means for switching the wireless device from the second RAN back to the first RAN, configured to:
switch the wireless device to one of the cells operating at the first signal frequency in the first RAN if each of one or more signal parameters from the one of the cells satisfies a criterion, and
otherwise switch the wireless device to another one of the cells operating at a second signal frequency in the first RAN based on one or more parameters from the another one of the cells, wherein the first signal frequency is different from the second signal frequency.

10. The apparatus of claim 9, wherein the one or more signal parameters satisfies a criterion comprises at least one of:
a cell signal strength above a power threshold; and
an SNR or an SINR value above a quality threshold.

11. The apparatus of claim 10, wherein the SNR or SINR is based on a ratio of a reference signal received power (RSRP) to a reference signal received quality (RSRQ).

12. The apparatus of claim 9, wherein the first RAN comprises a packet-switching (PS) network and the second RAN comprises a circuit-switching (CS) network.

13. The apparatus of claim 9, further comprising:
means for determining that one or more signal parameters from the another one of the cells fails to satisfy the criterion; and
means for selecting a cell using the second RAN,
wherein the means for switching the wireless device to the second RAN switches the wireless device from the first RAN back to the second RAN when the wireless device is unable to connect to a cell operating at the second signal frequency in the first RAN based on one or more parameters from another one of the cells.

14. The apparatus of claim 9, wherein switching a wireless device operating at a first signal frequency in a first RAN to a second RAN further comprises:
saving the first signal frequency.

15. An apparatus for switching between a first radio access network (RAN) using a first radio access technology (RAT) and a second RAN using a second RAT different from the first RAT, the apparatus comprising:
a memory; and
at least one processor coupled to the memory and configured to:
switch a wireless device operating at a first signal frequency in the first RAN to the second RAN; and
switch the wireless device from the second RAN back to the first RAN,
wherein the processor, when configured to switch the wireless device from the second RAN back to the first RAN, is further configured to measure, for a plurality of channel frequencies, a receive strength signal indicator (RSSI), generate a list of candidate cells in the first RAN that have a measured RSSI above a power threshold, and switch to a cell on the candidate cell list if its signal-to-noise ratio (SNR) or signal-to-interference-plus-noise ratio (SINR) is above a quality threshold, wherein the wireless device is switched to one of the cells operating at the first signal frequency in the first RAN if each of one or more signal parameters from the one of the cells satisfies a criterion, and wherein the wireless device is otherwise switched to another one of the cells operating at a second signal frequency in the first RAN based on one or more parameters from the another one of the cells, wherein the first signal frequency is different from the second signal frequency.

16. The apparatus of claim 15, wherein the one or more signal parameters satisfies a criterion comprises at least one of:
a cell signal strength above a power threshold; and
an SNR or an SINR value above a quality threshold.

17. The apparatus of claim 16, wherein the SNR or SINR is based on a ratio of a reference signal received power (RSRP) to a reference signal received quality (RSRQ).

18. The apparatus of claim 15, wherein the processor, when configured to switch a wireless device operating at a first signal frequency in a first RAN to a second RAN, is further configured to:
save the first signal frequency.

19. The apparatus of claim 15, wherein the first RAN comprises a packet-switching (PS) network and the second RAN comprises a circuit-switching (CS) network.

20. The apparatus of claim 15, wherein the at least one processor is further configured to:
switch the wireless device from the first RAN back to the second RAN when the wireless device is unable to connect to a cell operating at the second signal frequency in the first RAN based on one or more parameters from another one of the cells, wherein the is further configured to:
determine that one or more signal parameters from the another one of the cells fails to satisfy the criterion; and
select a cell using the second RAN.

21. A non-transitory computer-readable medium storing computer-executable code for switching between a radio access network (RAN) using a first radio access technology (RAT) and a second RAN using a second RAT different from the first RAT, the code, when executed by a processor, causing the processor to:
switch a wireless device operating at a first signal frequency in the first RAN to the second RAN; and
switch the wireless device from the second RAN back to the first RAN, including:
measuring, for a plurality of channel frequencies, a receive strength signal indicator (RSSI), code for generating a list of candidate cells in the first RAN that have a measured RSSI above a power threshold, and code for switching to a cell on the candidate cell list if its signal-to-noise ratio (SNR) or signal-to-interference-plus-noise ratio (SINR) is above a quality threshold, wherein the wireless device is switched to one of the cells operating at the first signal frequency in the first RAN if each of one or more signal parameters from the one of the cells satisfies a criterion, and wherein the wireless device is otherwise switched to another one of the cells operating at a second signal frequency in the first RAN based on one or more parameters from the another one of the cells, wherein the first signal frequency is different from the second signal frequency.

22. The non-transitory computer-readable medium of claim 21, wherein the first RAN comprises a packet-switching (PS) network and the second RAN comprises a circuit-switching (CS) network.

23. The non-transitory computer-readable medium of claim 21, the code, when executed by a processor, further causing the processor to:

switch the wireless device from the first RAN back to the second RAN when the wireless device is unable to connect to a cell operating at the second signal frequency in the first RAN based on one or more parameters from another one of the cells, including:

determining that one or more signal parameters from the another one of the cells fails to satisfy the criterion; and selecting a cell using the second RAN.

24. The non-transitory computer-readable medium of claim 21, wherein the switching a wireless device operating at a first signal frequency in a first RAN to a second RAN further comprises:

saving the first signal frequency.

25. The non-transitory computer-readable medium of claim 21, wherein the one or more signal parameters satisfies a criterion comprises at least one of:

a cell signal strength above a power threshold; and an SNR value or an SINR above a quality threshold.

26. The non-transitory computer-readable medium of claim 25, wherein the SNR or SINR is based on a ratio of a reference signal received power (RSRP) to a reference signal received quality (RSRQ).

* * * * *